UNITED STATES PATENT OFFICE.

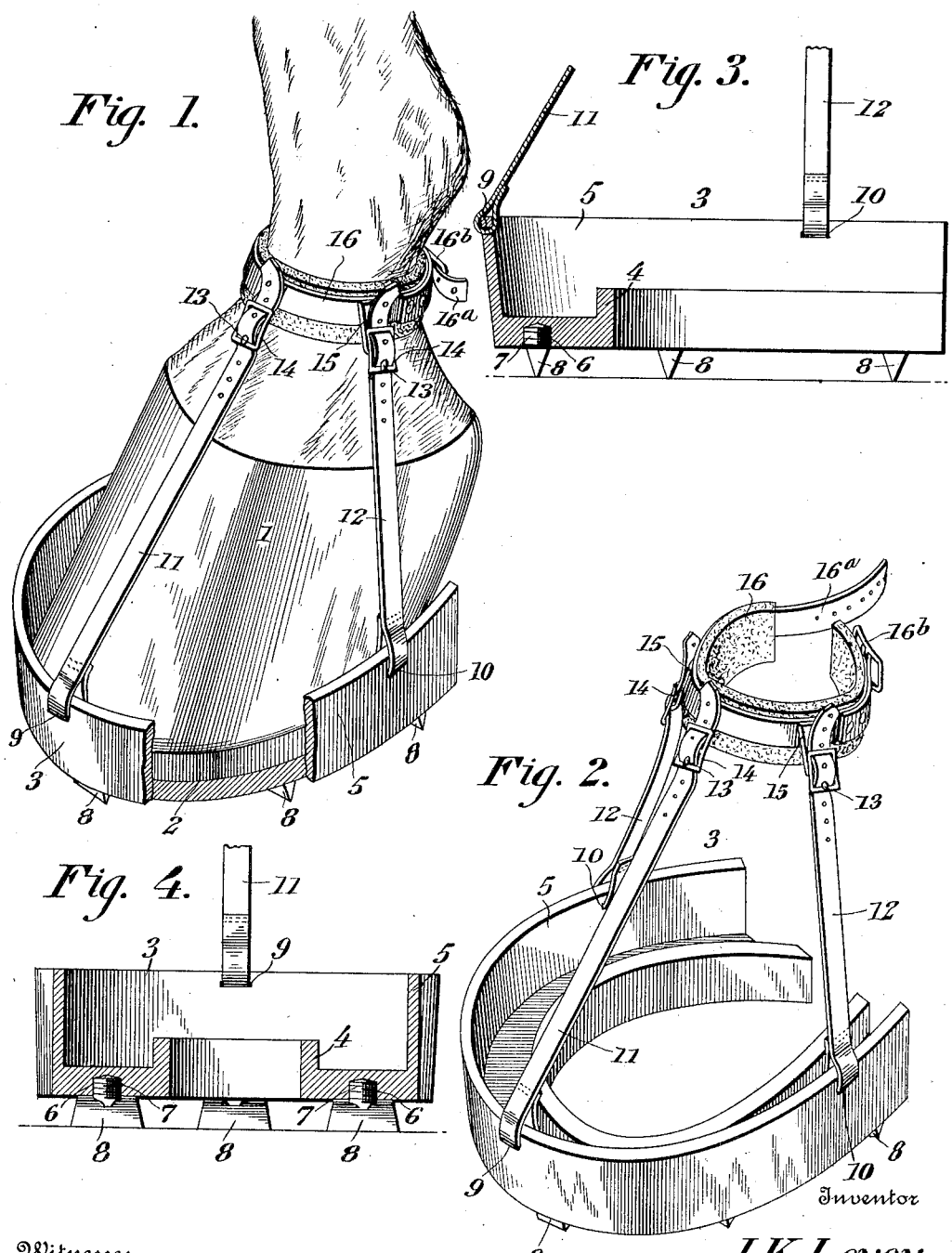

JOSEPH K. LEVEY, OF DETROIT, MICHIGAN.

HORSESHOE.

1,089,235. Specification of Letters Patent. Patented Mar. 3, 1914.

Application filed February 19, 1913. Serial No. 749,487.

*To all whom it may concern:*

Be it known that I, JOSEPH K. LEVEY, a citizen of the United States, residing at Detroit, in the county of Wayne and State of Michigan, have invented new and useful Improvements in Horseshoes, of which the following is a specification.

The present invention relates to improvements in auxiliary shoes or overshoes adapted to be applied upon the shoe of a horse's hoof during sleety or slippery weather, having for its object the construction of simple and highly efficient means whereby the slipping of the horse is prevented.

A further object of the invention is to provide a device of this character which can be readily and easily applied to a horse's foot and rigidly secured thereon against accidental displacement, but which at the same time provides for the ready removal of the device when desired.

The invention comprises the detail construction, combination and arrangement of parts substantially as hereinafter fully set forth and particularly pointed out in the claim.

In the drawing: Figure 1 is a view in perspective of my improvement in applied position upon a horse's hoof, Fig. 2 is a detail perspective view of the device detached, Fig. 3 is a central vertical longitudinal sectional view through the improvement, and Fig. 4 is a transverse sectional view of the same.

Referring to the drawings in detail, the numeral 1 designates the horse's hoof and 2 the shoe which is applied to the hoof. The improvement embodies a metal base or body portion 3, which is of a shape corresponding to the shape of the horse's hoof. The body 3 includes an inner flange 4 and an outer flange 5. The outer flange is of a greater height than is the inner flange, and the inner wall at the toe portion of said outer flange is preferably inclined from its connection with the body proper upwardly and outwardly to permit of the same being adjusted upon the hoof of an animal. The wall between the flanges 4 and 5 equals the width and corresponds with the shape of the horse shoe 2. The flange 4 is adapted to engage with the inner walls of the said horse shoe, the height of said flange being less than the thickness of the horse shoe so that the upper wall of the flange 4 will not contact with the hoof of the animal. The underface of the body 3 is provided at spaced intervals with threaded openings 6, the said openings adapted to receive the threaded shanks 7 of removable calks 8.

The outer flange 5 is provided at its toe portion, and adjacent its heel portions with elongated slots 9 and 10 respectively, the said openings adapted to receive the meeting ends of a front strap 11 and side straps 12. The front and side straps are provided with a plurality of openings which are adapted to receive the tongues 13 of buckle members 14 which are connected through the medium of straps 15 with a padded band 16. This band has one of its ends provided with strap 16$^a$, and is further provided with a buckle 16$^b$, which is disposed adjacent its opposite end. The band 16 is adapted to be arranged upon the ankle of the animal, and when the strap 16$^a$ is engaged by the buckle 16$^b$, and the straps 11 and 12 are engaged by their buckles, it will be noted that the device may be effectively sustained in proper position upon the shoe as well as upon the foot of the animal.

From the above description, taken in connection with the drawing, the simplicity of the device, as well as the advantages thereof will, it is thought, be apparent to those skilled in the art without further detailed description.

Having thus described the invention, what I claim as new is:

An auxiliary shoe adapted to engage with a horse shoe and to be secured to the hoof of an animal, comprising a base corresponding in shape to the horse shoe, said base being formed with an inner and an outer flange, the inner flange projecting above the base a less distance than the thickness of the horse shoe, the outer flange being of a greater height than the inner flange and comprising vertically straight side walls and its rounded wall at the toe portion thereof inclined outwardly from the base to permit of the insertion of the horse's hoof and shoe between the flanges and to further permit of a tight frictional contact between the flanges
5 and the horse shoe, removable calks for the device, and means for securing the device upon the ankle of an animal.

In testimony whereof I affix my signature in presence of two witnesses.

JOSEPH K. LEVEY.

Witnesses:
   CHAS. C. LUDY,
   EDWARD H. FLAHERTY.

Copies of this patent may be obtained for five cents each, by addressing the "Commissioner of Patents, Washington, D. C."